United States Patent

[11] 3,566,967

[72] Inventors Jack L. Shelton;
    Syed H. Raza; H. R. Froning, Tulsa, Okla.
[21] Appl. No. 834,899
[22] Filed June 19, 1969
[45] Patented Mar. 2, 1971
[73] Assignee Pan American Petroleum Corporation
    Tulsa, Okla.

[54] THERMAL PLUGGING WITH SILICATE SOLUTIONS
    6 Claims, No Drawings
[52] U.S. Cl. .................................................. 166/261,
                                                    166/288, 166/292
[51] Int. Cl. ................................................ E21b 33/138,
                                                    E21b 43/24
[50] Field of Search ..................................... 166/256,
                                            261, 272, 288, 292; 61/36

[56] References Cited
    UNITED STATES PATENTS

| | | | |
|---|---|---|---|
| 1,827,238 | 10/1931 | Joosten | 61/36 |
| 3,055,423 | 9/1962 | Parker | 166/261X |
| 3,070,159 | 12/1962 | Marx | 166/261 |
| 3,149,684 | 9/1964 | Eckel et al. | 166/292X |
| 3,196,945 | 7/1965 | Craig et al. | 166/261 |
| 3,198,249 | 8/1965 | Willman | 166/261X |
| 3,261,400 | 7/1966 | Elfrink | 166/292 |
| 3,285,338 | 11/1966 | Boston | 166/292X |
| 3,306,355 | 2/1967 | Maly | 166/292 |
| 3,375,872 | 4/1968 | McLaughlin et al. | 166/292 |

Primary Examiner—Ian A. Calvert
Attorneys—Paul F. Hawley and Buell B. Hamilton

ABSTRACT: In an underground forward combustion process for recovering petroleum from earth formations, more uniform progress of the combustion front through a formation over a wide area is obtained by injecting a water solution of a water-soluble silicate after the combustion operation has been started. As the solution approaches the combustion front, evaporation of water results in formation of a cohesive, solid mass in the pores of the formation. Flow channels are plugged in this way, providing a more uniform progress of the combustion front. Preferably, the silicate solution is preceded and followed by water. If the formation contains exposed silica, sodium silicate can be formed in the formation by injecting sodium hydroxide.

THERMAL PLUGGING WITH SILICATE SOLUTIONS

Many methods are used to recover oil from oil-bearing underground formations. In one method, air is injected into the formation and the oil is ignited at the injection well. Continued injection of air causes a combustion front to move through the formation forcing oil ahead of the front to producing wells through which the oil is produced to the surface. The combustion front naturally moves most rapidly through the most permeable zones of the formation. The front reaches the producing wells through the more permeable zones before all the oil is recovered from the less permeable zones. Even in any one zone of uniform permeability, the front tends to streak through in an approximately straight line from an injection well to a producing well without fanning out very far laterally in the zone. In addition, the movement of the combustion front is inherently unstable even in zones of uniform permeability. Once a small section of the front gets ahead of the remainder of the front, this small section tends to move ahead more rapidly than the remainder of the front. This is because the permeability of the formation behind the front is very high compared to the permeability ahead of the front. When a small section of the combustion front gets ahead of the remainder of the front, there is a shorter length of the low permeability portion ahead of this section than ahead of the remaining front. Therefore, flow of fluids is more rapid along the path including this shorter length of low permeability ahead of the advanced section of combustion front and this section moves ahead even more rapidly.

Before a combustion operation is started, movement of the front in zones of different permeability can be made more uniform by injecting a material to form a partial plug in the formation. More of the plugging material goes into the highly permeable zones than into the less permeable zones, thus plugging the more permeable zones to a greater degree. The plugging materials for this purpose may be foams, activated silicates, finely divided solids, settable liquid resins, or the like.

Even though a partial plugging operation is used before combustion is initiated, nonuniform progress of the combustion front may develop even in a zone of uniform permeability, as explained above. The problem is to decrease the nonuniform progress of the front after the combustion operation has started. If ordinary plugging techniques are used in the burned-out region around the injection well, the high temperature complicates control of the plugging operations. If a plug is formed near the injection well, the injected gases immediately rearrange themselves into previous patterns as soon as they have penetrated the plugged volume and enter the highly permeable burned-out formation between the plug and the combustion front. If a plug is formed near the combustion zone, control problems due to higher temperatures become extreme.

An object of this invention is to provide a method for forming a partial plug in the burned-out portion of a formation behind an underground forward combustion front. A more specific object is to provide a process for forming a partial plug in the burned-out portion of a formation near an underground forward combustion front. Still other objects will be apparent to those skilled in the art in view of the following description and claims.

In general, we accomplish the objects of our invention by injecting through the injection well into the burned-out formation a water solution of a water-soluble silicate, such as sodium silicate. As the solution approaches the combustion zone, the water evaporates. The result is a deposit of the water-soluble silicate in the main flow channels of the formation near the combustion zone. The silicates seem to be rather unique among inorganic materials in depositing a cohesive, solid, glassy material when water solutions are evaporated.

A batch of water may precede the silicate solution through the formation. Another batch of water may follow the silicate solution. The batches of water may contain sodium hydroxide. It is possible to inject only sodium hydroxide solution in many formations, the sodium hydroxide reacting with exposed silica in the formation to form the desired sodium silicate solution within the formation.

The The most readily available and least expensive of the water-soluble silicates are the sodium silicates. These are not definite chemical compounds but have a rather wide range of possible ratios of silica (silicon dioxide) to sodium oxide. For our purposes, this ratio can vary within limits from about 1.5 to 1 to about 4 to 1. Preferably, the ratio should be from about 3 to 1 to about 3.5 to 1. In the case of sodium silicates, this ratio is both a weight ratio and a mole ratio. For other silicates, however this is a mole ratio.

To avoid high viscosities, an upper limit of about 30 percent by weight of silica should be observed. In order to form an effective plug with an easily handled volume of solution, a minimum limit of about 1 percent silica should be observed. Preferably, a concentration in the range from about 3 to about 10 percent of silica should be used.

Potassium silicates can be used in place of sodium silicates. However, the greater costs limits the use of potassium silicates. Some of the mixtures of sodium and potassium silicates are sometimes preferred because of the low viscosities of their aqueous solutions.

A tube was filled with tar sand from the Athabasca field in Alberta Canada The tar had been previously burned from this sand. A 12-inch length of the tube was surrounded with a heater. Thermocouples were attached to this section of the tube so the temperature could be measured. A solution of sodium silicate was injected into the packed tube. The solution contained about 10 percent by weight of silica. The silica-to-sodium oxide ratio was about 3.22 to 1. A back pressure of about 400 p.s.i.g. was held on the tube. When the packed tube was filled with sodium silicate solution, the heater was turned on while injection of the silicate solution continued. The amount of heat, and therefore the temperature of the heated section of tube, was increased in steps. The flow rate through the tube was maintained constant while the pressure differential across the tube varied. This pressure differential was measured to determine the degree of plugging. At temperatures up to about 400 F., the pressure differential remained below 10 p.s.i. When the temperature was increased to about 450° F., however, the pressure difference increased in a few hours to 600 p.s.i.

After the tube was cooled, the heated portion was cut into sections and the ends of the sections were examined microscopically. The examination india indicated that, as heating began, a clear, solid, cohesive layer was deposited on the sand grains, cementing the grains together and sometimes filling the pores. In the zone where the temperature reached about 300° F., the deposit became white and crystalline, and completely filled the pores. In the zone where the temperature reached about 45° F., and the water evaporated to form steam, the deposit was in the form of clear foam cells. In the cooler zones downstream from the 450° F. section, the sand grains were cemented together but the pores remained open.

From this test, it will be apparent that if a sodium silicate solution is introduced into the burned-out formation surrounding an injection well in an underground combustion operation, a cohesive, solid deposit will be formed in the formation as the solution approaches the combustion front. When the solution reaches a point where the water in the solution evaporates, a solid foam is formed, which plugs the pores of the main flow channels, diverting air flow into other flow paths.

When a treatment is being designed, the volume of silicate solution will depend upon the concentration of silica in the solution and the volume of pore space to be plugged. Since the object is to plug streaks, a much smaller volume of solution can be used than in some processes where the entire formation is to be plugged. If, for example, a streak 12 feet high and 20 feet wide is to be plugged for a distance of 1 foot, and if the porosity is 36 percent, the volume of pore space is about 86.5 cubic feet. This volume of solid sodium silicate with a density of about 2.4 grams per milliliter weighs about 13,000 pounds. If the concentration of silica is about 10 percent and the ratio of silica to sodium oxide is about 3.2 to 1, the solution will weigh about 170,000 pounds. The volume will be about 20,000 gallons or about 480 barrels (42 U.S. gallons per barrel).

If a 2 percent solution is used, the volume should be five times as great. If a 20 percent solution is used, the volume should be half as great. If an injection well is surrounded by four producing wells and four streaks are expected, the volume should be about four times as great. The volume should also be adjusted for the porosity of the formation to be treated, for the estimated width and height of the streak and for the length of the desired plug.

As noted above, most of the silicate is deposited as a solidified foam. Of course, a smaller amount of solid in the form of foam is required to fill a given pore volume than if the solid is in a dense unfoamed state. Therefore, the volumes suggested above by way of example are somewhat larger than are usually actually required.

As a solid silicate coating begins to deposit on the pore walls, flow is restricted through these pores and is increasingly diverted to other flow paths. Therefore, a complete plug is not necessary. A partial plug provides considerable benefits. If a complete plug of any length forms, even a fraction of an inch, flow is completely diverted from the plugged flow channel and the plug length does not increase. It will be apparent that a complete plug a foot long would be difficult to form in our process. Again, it is obvious that the volumes of silicate solution suggested above are larger than necessary to produce at least some benefits.

A volume of liquid water should precede the silicate solution through the formation. It is well known that many chemicals, such as acids and some salts, will cause silicate solutions to gel if the chemicals are added to the silicate solution. As a combustion front moves through a formation most of the brine naturally present in the formation is forced to move through the formation ahead of the combustion front by oil vapors and combustion products. Some of the water lags behind and is evaporated by the heat of the combustion. Salts from this evaporated brine are deposited in the formation. Then, as the silicate solution moves through the formation, it dissolves these salts which may cause premature gelation of the silicate solution before it gets near the combustion front. When a water bank is injected ahead of the silicate solution, the water dissolves and readily water-soluble salts so they move on ahead of the silicate solution. The silicate solution is thus protected from the effects of these salts.

The presence of carbon dioxide may also present a problem. As a combustion zone moves through a formation, some of the formation is burned clean. That is, all organic matter is burned out of the formation. Even under good conditions, there are at least small, local areas which are not completely burned out. As air continues to pass around and through these areas, carbon dioxide is formed. It is known that carbon dioxide is a very effective gelling chemical for silicate solutions. The water bank ahead of the silicate solution also dissolves any carbon dioxide which may be present, thus protecting the following silicate solution from this chemical. To prevent premature gelation of the silicate solution, the $pH$ should be maintained above about 11.0 and preferably above about 11.5.

The water bank may contain a strongly basic chemical, such as an alkali metal hydroxide, for example, sodium hydroxide. This is particularly desirable if there is reason to believe that large amounts of carbon dioxide may be present in the formation. The strongly basic chemical neutralizes the carbon dioxide, thus more effectively preventing premature gelling of the silicate solution.

In sandstones, sodium hydroxide solution can be used without silicate solution. The sodium hydroxide reacts with the silica to form sodium silicates within the formation. This is ordinarily a rather slow reaction, but at the high temperatures behind a combustion zone, the reaction proceeds rapidly. The reaction is well known. See, for example, Encyclopedia of Chemical Technology, by Kirk and Othmer, 1st Ed., Interscience Publishers, Inc. N.Y., Vol. 12, Page 322. After the silicate is formed, the behavior is the same as if the silicate had been preformed and injected into the formation. Most limestones contain silica. In some limestones, this silica is sufficiently exposed to the pores to be dissolved by a strong hydroxide solution. The technique of injecting caustic soda solution for forming the silicate within the formation can also be used in such limestones. For this purpose, the sodium hydroxide concentration should be between about ½ and about 10 percent by weight and preferably from about 1 to about 3 percent by weight. Potassium hydroxide or mixtures of potassium hydroxide and sodium hydroxide can be used in place of sodium hydroxide. Slightly higher concentrations of potassium hydroxide should be used to compensate for the higher molecular weight.

The batch of water which precedes the silicate or hydroxide solution may precede the solution by a considerable distance. Once the water removes salts, carbon dioxide, and the like, from the burned-out formation, the formation remains free of these materials, so the silicate or hydroxide solution may follow at any time. It should be noted, however, that as the batch of water containing the salts, carbon dioxide, and the like, approaches the combustion front, the water evaporates, releasing the carbon dioxide, and redepositing the salts in the formation. Then, as the silicate solution moves through the formation, it picks up the salts. If the water precedes the silicate solution by a considerable distance, the salt will be deposited, and the combustion zone will move ahead a considerable distance before the silicate solution reaches the salt. Thus, chemical setting of the silicate by the salt may occur a considerable distance behind the combustion zone. For this reason, it is preferred that at least some water be injected immediately ahead of the silicate or hydroxide solution.

If a batch of water precedes the silicate solution, the volume of this water should preferably be at least about the same as the volume of the silicate solution. One advantage of the batch of water is that it cools the hot formation, permitting the silicate solution to get closer to the combustion zone before the water in the solution evaporates. For the purpose of cooling the formation, the volume of the batch of water may be several times the volume of the silicate solution. This water may be injected intermittently with air injected to support combustion. This avoids any danger that an excessive amount of water might quench the combustion. It will be recognized that the alternate injection of air and water is already regarded as one of the more favorable ways to conduct an underground combustion operation.

If the volume of the batch of water is to be small, another technique may be used to insure a close approach of the silicate solution to the combustion zone before the water evaporates. This is to hold back pressure on the producing wells to build up the pressure in the reservoir. The higher the pressure, the higher the temperature required to evaporate the water. Therefore, at higher pressures, the silicate solution approaches the combustion zone more closely before the water evaporates from the solution.

A considerable volume of water should also follow the silicate solution. If the solution is simply injected into the formation, and is then followed by air only, the solution will remain near the well bore to establish the irreducible minimum water saturation of from about 10 to about 30 percent in the pores of the formation. Of course, this is satisfactory when the combustion zone is near the injection well, but when the combustion zone is not near the injection well, water should be injected after the silicate solution to displace the silicate solution ahead toward the combustion zone. A very advantageous way of employing our process is to inject air and water alternately after the silicate solution as well as before.

In the preferred process, air and water are alternately injected until it is decided that plugging is required. Then a silicate solution is injected. This is followed by more air and water until silicate solution is again injected. The process continues with a batch of silicate solution being occasionally substituted for one of the batches of water.

Our process can be applied to a producing well as well as to an injection well. In this case, use of a sodium hydroxide solution ahead of the silicate solution is particularly desirable. Frequently, the combustion zone will travel quickly through a permeable streak to a producing well. It is usually possible to detect the approach of the combustion zone by temperature increase, or the like. It is desirable, of course, to plug the permeable streak and direct the combustion into the less permeable zones. The plug may be applied from the injection well, producing well, or both. If applied from the producing well, the plugging solution of silicate must be injected through the formation filled with combustion gases from the combustion zone. These products are rich in carbon dioxide. Therefore, a sodium hydroxide solution should precede the sodium silicate solution to remove the carbon dioxide and prevent premature gelling of the silicate solution.

Our process can also be applied to reverse combustion operations. The description to this point has been directed almost entirely to forward combustion. In this process, combustion is initiated at an injection well. Air is then injected to move the combustion zone from the injection well toward at least one producing well. In reverse combustion, air is injected into an injection well until it appears at a producing well. Combustion is then initiated at the producing well. The combustion zone then moves from the producing well toward the injection well. In this process, a silicate solution can be injected into the formation through the injection well. When this solution reaches the combustion zone, the water in the solution flashes into steam leaving a solid foam of silicate to plug the main channels of flow and divert the air into the less permeable zones. As in the case of forward combustion, the silicate solution should be displaced through the formation with water, preferably introduced in batches alternated with air.

Our process depends upon the high temperature of a combustion zone to provide a plugging effect. Therefore, it is applicable only after a combustion operation has been initiated. Other plugging techniques, such as forming foams, injecting stable resins, or even chemically setting silicate solutions can be used to plug highly permeable zones before combustion starts. In some cases, these other plugging techniques can also be used after combustion starts. It will be apparent that our process can be used in combination with many of these other plugging techniques to obtain even better results than can be achieved by the single plugging techniques alone.

Our process will be better understood from the following example. An injection well is surrounded by four producing wells. All the wells penetrate an oil-bearing formation about 100 feet thick. Combustion has been initiated in the oil-bearing formation at the bottom of the injection well and air has been injected into this well for about sixty days together with occasional batches of water. In order to reduce channeling of this air through the formation, a water solution of sodium silicate is injected into the formation through the injection well. The solution contains about 65 percent water and about 35 percent of a concentrated commercial sodium silicate solution, both percentages being by volume. The concentrated silicate solution contains about 28.7 percent by weight of silica with a silica-to-sodium oxide ratio of about 3.22 to 1. The final water solution contains about 10 percent by weight of silica. The volume of 10-percent solution is about 20,000 gallons. As soon as the solution is introduced into the injection well, injection of air with occasional batches of water is resumed. The silicate treatment is repeated every sixty days until breakthrough of the combustion zone occurs into the producing wells. This takes place about 14 months after initiating the combustion. The time of breakthrough and the oil production recovered to breakthrough are greatly increased over the values which are usual without the plugging action.

Several alternates and variations have been described. These are presented by way of example only. Still other alternates and variations will occur to those skilled in the art. Therefore, we do not wish to be limited to the examples given but only by the following claims.

We claim:

1. In an underground combustion process in which an oxygen-containing gas is injected through an injection well and into an oil-bearing formation to support a combustion zone which moves through the formation to increase the recovery of oil from a producing well penetrating the formation, the improvement comprising forcing through said formation toward said combustion zone, after the combustion has proceeded for some time, a first solution which is a water solution of a hydroxide selected from the group consisting of sodium hydroxide, potassium hydroxide and mixtures of sodium hydroxide and potassium hydroxide, displacing said first solution through said formation with a second solution which is an aqueous solution of a water-soluble silicate selected from the group consisting of sodium silicates, potassium silicates, and mixtures of sodium silicates and potassium silicates, the $pH$ of said second solution being at least about 11.0, whereby, as the second solution approaches the combustion zone, a cohesive, solid silicate is deposited in the principal flow channels, thus diverting flow into other portions of the formation and decreasing channeling tendences.

2. The method of claim 1 in which the silicate is sodium silicate having a silica-to-sodium oxide mole ratio between about 1.5 to 1 and about 4 to 1, and the concentration of said silicate in said solution is sufficient to provide a silica concentration between about 3 and about 10 percent by weight.

3. The method of claim 1 in which the silicate solution is followed by water which displaces the silicate solution through the formation toward the combustion zone.

4. The method of claim 3 in which said water is injected in small batches alternated with said oxygen-containing gas.

5. In a forward combustion process in which air is injected through an injection well into an oil-bearing formation to support a combustion zone which moves through the formation displacing oil ahead of the combustion zone to a producing well from which oil is produced to the surface, the improvement comprising injecting through said producing well into said formation an aqueous sodium hydroxide solution to absorb carbon dioxide, then injecting an aqueous solution of a sodium silicate having a silica-to-sodium oxide mole ratio from about 3.0 to 1 to about 3.5 to 1, said sodium silicate being present in a concentration sufficient to provide a silica concentration from about 3 to about 10 percent by weight, and the $pH$ of said sodium silicate solution being at least about 11.5, and then injecting sufficient water to displace said sodium silicate solution to a point sufficiently close to said combustion zone to form a plug in the principal flow channels of the formation.

6. In a forward combustion process in which air is injected through an injection well into an oil-bearing formation to support a combustion zone which moves through the formation displacing oil ahead of the combustion zone to a producing well from which oil is produced to the surface, the improvement comprising injecting through said producing well into said formation an aqueous sodium hydroxide solution to absorb carbon dioxide, then injecting an aqueous solution of a water-soluble silicate selected from the group consisting of sodium silicates, potassium silicates, and mixtures of sodium silicates and potassium silicates, the $pH$ of said sodium silicate solution being at least about 11.0, and then injecting sufficient water to displace said sodium silicate solution to a point sufficiently close to said combustion zone to form a plug in the principal flow channels of the formation.